United States Patent Office 3,400,170
Patented Sept. 3, 1968

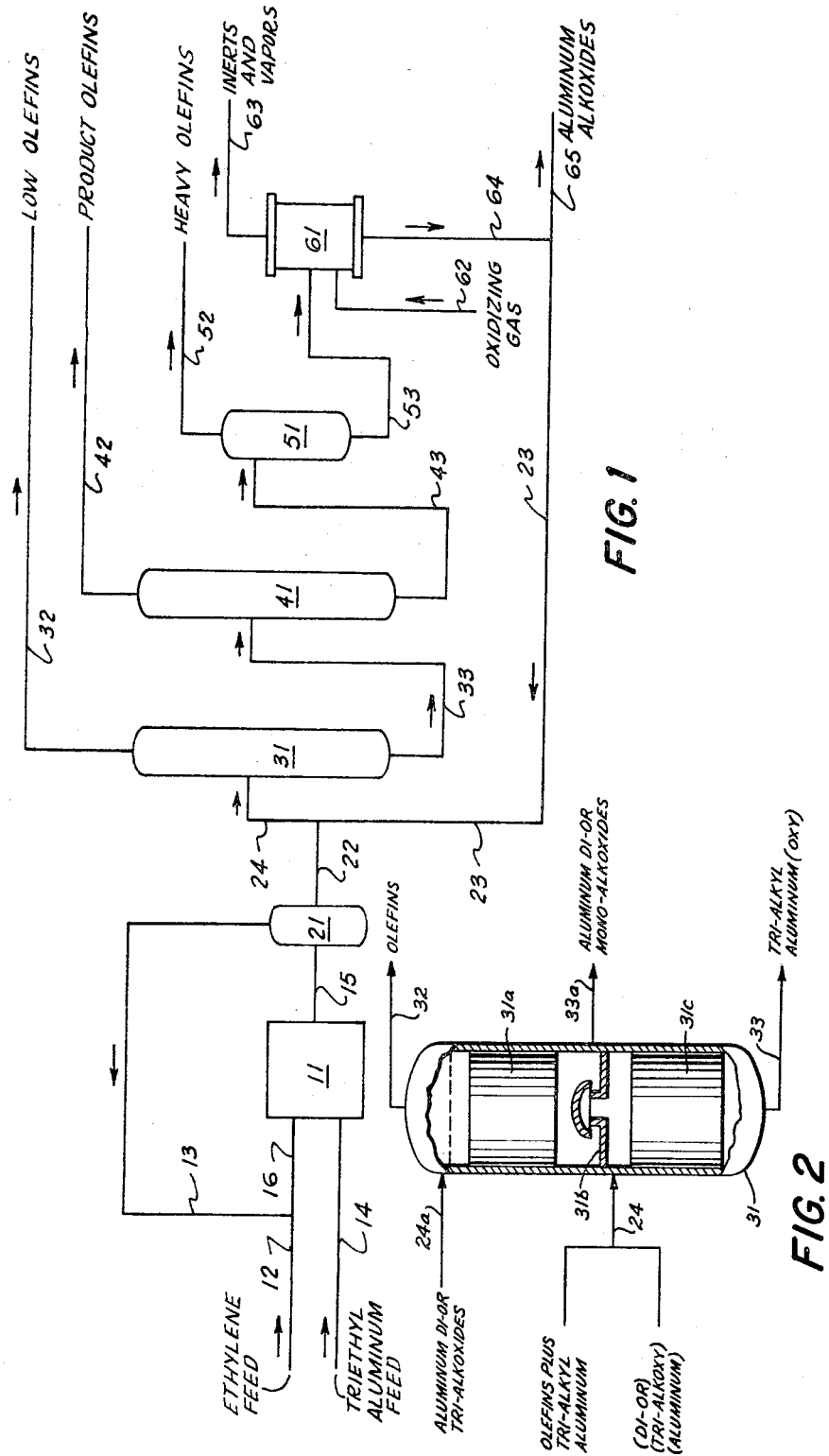

3,400,170
PROCESS FOR RECOVERING OLEFINS FROM MIXTURES WITH ALUMINUM ALKYLS
John K. Presswood and Walter E. Foster, Baton Rouge, La., assignors to Ethyl Corporation, New York, N.Y., a corporation of Virginia
Continuation-in-part of application Ser. No. 198,113, May 28, 1962. This application Mar. 16, 1967, Ser. No. 634,015
7 Claims. (Cl. 260—677)

ABSTRACT OF THE DISCLOSURE

The separation of olefin materials from trialkyl aluminum materials is enhanced by reacting with di- or trialkoxy aluminum alkyl species to convert all trialkyl aluminum molecules to at least a mono alkoxy aluminum species and separating. Enhanced separation is obtained and isomerization, dimerization and other reactions catalyzed by trialkyl aluminum materials are minimized. The olefin materials and trialkyl aluminum materials can be in liquid or vapor phases or combinations. Generally speaking, the olefins are then recovered as a vapor and the aluminum materials as liquid.

---

This application is a continuation-in-part of Ser. No. 198,113 filed May 28, 1962 and now abandoned.

This invention relates to an improvement in the manufacture of relatively low molecular weight alpha olefin products. More particularly, the invention relates to an improved operating procedure whereby olefin hydrocarbon materials are not degraded during recovery operations.

Of recent years, considerable interest has developed in the manufacture of alpha olefin hydrocarbons of the normally liquid molecular weight range, these materials being desired for a variety of purposes in further utilization. By the term low molecular weight alpha olefins is meant, herein, the primary olefins of from six to about twenty carbon atom content in the molecule, with particular interest being exhibited for the range of decene to octadecene alpha olefins and an even more particular interest being displayed for the fraction including dodecene tetradecene and hexadecene.

One highly attractive potential method of synthesizing olefins of the above described character from ethylene, involves the use of trialkyl aluminum materials either as catalysts, or as a stoichiometric reagent. A catalytic polymerization of ethylene to produce olefins in the molecular weight range described is characterized by the truly catalytic function of the trialkyl aluminum components. By this is meant that a large number of moles of olefins, generally, is synthesized relative to the quantity of catalyst present in a reaction zone. The catalytic method has considerable appeal, but its acceptance and utilization has not been realized because of certain weaknesses hereafter mentioned.

The other major approach to making the alpha olefins involves the stoichiometric chain growth, of a plurality of ethylene molecules on each alkyl group of a trialkyl aluminum starting material, followed by a so-called displacement process, wherein a long alkyl group is released by the trialkyl aluminum compound as an olefin, and a new alkyl group of shortened length is established, whereby trialkyl components suitable for recycling to the chain growth operation are engendered.

In both of the foregoing types of processes, a particular objective has been to attain an alpha olefin product mixture having a high, consistent, and reproducible content of the vinyl olefins. By vinyl olefins is meant the normal unbranched alpha olefins, whereas the usual undesired impurities are vinylidene type olefins, wherein a branched alkyl moiety is attached at the two carbon of the alpha olefin molecule. Another highly undesirable impurity in the olefins engendered by a catalytic process are internal olefins, especially the trans-isomers. In general, it is desired to obtain olefin products for marketing of for further use, having a vinyl olefin purity of at least about 90 weight percent in a relatively narrow cut fraction, and preferably of the order of about 95 weight percent.

A further problem arises, however, in the fact that the alkyl aluminum components employed as the catalyst must, obviously, be separated from the mixture of olefins which is the major portion of a reactor effluent. In carrying out a catalytic ethylene polymerization with a trialkyl aluminum catalyst, the alkyl groups thereof tend to themselves be increased in chain length, and, in fact, appear to exhibit a distribution of chain lengths roughly corresponding to the distribution of the olefins made.

An obvious mode of separating trialkyl aluminum constituents of a reactor effluent from the other components thereof, is to carry out a fractional distillation. It has been discovered, however, that at the temperatures of operation necessary to achieve a fractionation, i.e., in the reboiler of a fractionating column, the temperatures necessarily used, in conjunction with the presence of the trialkyl aluminum catalyst residues exhibit a pronounced deleterious effect. In other words, the very fact of separating olefin product streams, or by-product streams, from trialkyl aluminum constituents of a reactor effluent, in itself, using the usual approach, will result in a quality decrease for the final alpha olefins engendered. This quality decrease is exhibited as the appearance of internal olefins, of various positions in a multi-carbon molecule, the trans-isomers being by far the predominant internal olefin isomer, but the cis-isomer also being found. As said internal isomers are not desirable for the majority of uses for which the vinyl olefins are desired, they constitute a highly undesirable impurity. In addition to the internal olefins which are formed, it is also found that attempts to fractionate result in a substantial increase in the amount of vinylidene alpha olefin impurities. The precise reaction mechanisms are not known which result in internal olefin or vinylidene olefin impurities. However, it is definitely established that the presence of trialkyl aluminum, when the reactor effluent is subject to distillation conditions, results in the formation of the above undesired impurities.

Among the end uses to which the desired vinyl olefin fraction can be provided are feed stocks for the formation of alkyl aromatic compounds, which find utility as solvents or as starting materials for the preparation of synthetic detergents. The vinyl olefins can also be used to manufacture normal alcohols by the anti-Markownikoff addition of hydrogen halides and the subsequent hydrolysis to yield a normal monohydric compound. The vinyl olefins are also subject to pyrolytic dehydrogenation or catalytic dehydrogenation to yield diolefins which are suitable as starting materials for formation of polymers or copolymers with other monomers, or as starting materials for the preparation of dihydroxy compounds.

As mentioned above, however, considerable difficulty has been encountered in providing a process yielding the desired product streams free of the non-vinyl isomers because of the recovery problem described.

An object of the present invention is, then, to provide an improvement in a process of making vinyl olefins by the alkyl aluminum-catalyzed polymerization of ethylene, said improvement substantially eliminating the formation of non-vinyl isomers in the final recovered product. A more particular object is to provide such an improvement, in a process including a catalytic polymerization operation and fractional recovery operations, wherein the recovery operations are at conditions which substantially promote or favor the formation of non-vinyl olefin isomers from the alpha olefins actually synthesized in the catalytic polymerization operation per se. Yet another object of the preferred embodiment of the improvement is to provide a method of preventing isomer formation during fractionation recovery operations, wherein the improvement does not necessitate the introduction of extraneous and undesirable materials.

Another object of the present invention is to provide improved separation of olefins and trialkyl aluminum materials where either or both are in the vapor phase and additionally wherein separation from trialkyl aluminum materials is enhanced for non-vinyl olefins.

Other and other further features of the present invention will become apparent upon careful consideration of the following description and drawings wherein:

FIG. 1 is a flow sheet of a plant installation embodying features of the present invention.

FIG. 2 shows additional details of fractionator 31 of FIG. 1 useful in exemplifying various features of the present invention.

In its simplest expression the present invention is illustrated in FIG. 1 in the step of treating a stream in line 24 containing olefins and trialkyl aluminum materials from line 22 with a reactant from line 23 to convert the trialkyl aluminum constituents to components having on the average at least one and up to three alkoxide groups per molecule and the separation of olefins in fractionator 31. Thus, the trialkyl aluminum materials are converted to dialkyl aluminum alkoxide, alkyl aluminum dialkoxide, or aluminum trialkoxide components, or mixtures thereof. Thus converted, it is found that separation operations, even at rigorous conditions, can be readily carried out yielding non-degraded olefins in line 32 and alkoxy aluminum alkyl species in line 33.

In carrying out the process, it is frequently desirable to accomplish the above conversion without introducing inert gaseous components. Thus, although air can be used to accomplish the oxidation, gaseous oxygen is preferred. An even more beneficial class of embodiments of the invention involves the use of a high-alkoxide aluminum component, to interreact with the trialkyl aluminum constituent of the stream and provide the desired conversion by a completely liquid phase reaction treatment. The treatment provides a conversion of the trialkyl aluminum constituents of the process stream to compounds averaging at least one alkoxide group in each molecule. In the course of this treatment, the higher aluminum alkoxide components lose a portion of their alkoxide groups, which are replaced by alkyl groups. The compounds thus derived necessarily contain at least one alkoxide group per mole; hence, in these embodiments, the recycled high-alkoxide aluminum component is apportioned to provide excess alkoxide groups in quantity at least sufficient to provide one alkoxide group per mole of trialkyl aluminum constituent in the stream being treated.

In certain embodiments the so-treated stream can then be safely again subjected to conditions which would otherwise result in adverse effects due to the presence of trialkyl aluminum materials. The alkyl aluminum alkoxide components can be safely concentrated by a plurality of fractionations in a stream including olefins of higher molecular weight than normally desired. This stream is then subjected to oxidation with an oxidizing gas to convert the entire alkyl aluminum alkoxide components present to high-alkoxide constituents. In brief, the alkyl aluminum alkoxide constituents are oxidized further to the extent of, usually, averaging at least two alkoxide groups per molecule, and up to the corresponding aluminum trialkoxides. The thus oxidized stream is returned in part to the above-mentioned treating step of the feed stream to the fractionation section. The portion not returned can be reacted with an aqueous agent to convert the non-recycled high-alkoxide components to alcohols and an aluminum inorganic compound. Customarily, the heavy olefin constituent present in such a portion of the stream are removed prior to said hydrolysis, but this is not essential.

The present alkoxide treatment to facilitate the recovery of olefins from mixtures thereof with trialkyl aluminum materials has extremely useful application in several ways. In addition to liquid phase situations, either or both the olefins and trialkyl aluminum materials can be in the vapor phase or in mixtures of partially liquid, partially vapor phase condition. In addition to inactivating the trialkyl aluminum materials as catalysts of olefin alteration, the treatment has a very significant secondary benefit that in many instances can be more sought-after than the inactivation per se. This secondary benefit arises through the vapor pressure or boiling point differences between trialkyl aluminum materials and the corresponding dialkyl aluminum monoalkoxide materials.

To exemplify the foregoing, reference is now made to FIG. 2, particularly with regard to fractionator 31. Incompletely reacted trialkyl aluminum materials entering this vessel are frequently vaporized or "atomized" in the reboiler thereof or on the way to the reboiler, passing upward as vapor and as droplets. This material upon encountering incoming di- or trialkoxy aluminum material supplied through line 24 will react to be converted to a partial alkoxy species. Thus the reactions in 31 below line 24 (in portion 31–C) include not only a continuing reaction between the alkyls and alkoxides of the incoming stream from line 24 in liquid stream form but also include a liquid phase-vapor phase contacting between the alkoxides and trialkyl aluminum material that tends to pass overhead in 31. Such reaction traps the overhead-going material as a low vapor pressure liquid alkoxide species which then passes downward in liquid form to exit through line 33.

So effective is this treatment that it is beneficial in some instances to supply an additional di- or trialkoxide stream or mixture to fractionator 31 above the point of entry of line 24 as through line 24–a using conventional plates or packing 31–a between line 24–a and line 24, to react with trialkyl aluminum vapor and droplets that pass upward in fractionator 31 above the feed line 24. This provides a very pure overhead olefin stream having extremely small content of aluminum materials, typically 0.1 percent by weight, or less.

In many instances where the recovery of olefins from trialkyl aluminum materials is desired one may not wish to convert all the trialkyl aluminum materials to an alkoxide species but yet may wish to obtain the excellent separation of vaporized and entrained trialkyl aluminum material from the (upper) portion of fractionator 31 above the feed line 24 as mentioned in the preceding paragraph. Such may be exemplified in "flash" separations where the contact time in the lower portion of the fractionator 31–c below line 24 is so short or the temperature so low that there is not a great deal of concern over catalyzed degradation in that region, but where trace quantities of trialkyl aluminum materials passing overhead in vapor or entrainment form together with the olefins are very much undesired as where the olefins are later fractionated and thereby heated sufficiently to cause degradation.

In this instance it is frequently advantageous with a feed of di- or trialkoxide through line 24–a above contacting section 31–a to place a partition or collector 31–b across the fractionator 31 above line 24 which permits the free flow upward at that point of vaporized and entrained olefins and trialkyl aluminum material into the upper plate or packed section 31–a but which collects the liquid downflow of alkoxide materials and diverts it so that it does not mix with the liquid material in the fractionator 31 below the feed line 24. Such a partition typically has a form of a transverse plate with a central stack having over it an umbrella arrangement to shed liquid but permitting free upward passage of vapor. Liquid collecting above the plate is then withdrawn through line 33–a placed just above the plate. The result of this is (1) a very pure overhead olefin stream in line 32 having extremely small contamination by aluminum materials, (2) a bottoms trialkyl aluminum stream in line 33 with little or no alkoxide content and (3) a side stream of alkoxy aluminum species in line 33–a. Although the second and third streams may permissively contain olefins, the presence or absence of such is not essential.

In further extension of the foregoing, the volatility aspects of the treatment with di- or trialkoxide (aluminum) species of mixtures containing trialkyl aluminum materials is so startling and effective as to make such desirable to facilitate recovery of pure olefins even where degradation of the olefins is not a prime consideration. Thus although the main force of the present invention is directed toward separations which preserve vinyl olefins without degradation, such as by isomerization or dimerization; the invention also is highly valuable in separations where the olefins are not predominantly vinyl, typically being in large part internal or vinylidene types or mixtures of several or all types.

To illustrate the principle of the invention, the following examples show the effect of heat on formation of non-vinyl olefin isomers, starting with a particular reagent grade olefin, such as is found in the effluent mixture from a catalytic polymerization operation. In these series of examples, 1-eicosene was employed, and analysis of this eicosene showed that, as received, it contained about eight weight percent of the trans-internal isomers. This particular sample did not contain any vinylidene olefins. A charge of 110 grams of the olefin was employed in each of the operations for which the results are tabulated below. The operation included charging to a flask provided with a thermometer, stirrer, condenser and nitrogen blanket system. In all cases the specimen was purged of oxygen by passing nitrogen over the charge, and then the specimen was heated, with stirring, to 260° C. Samples were removed at 15, 30 and 60 minute intervals, and then analyzed by infrared absorption to determine the change in composition if any. In most of the operations, aluminum compounds were added in concentrations corresponding to an aluminum metal concentration of 0.2 weight percent, except in one noted instance.

As previously described, the process is applied to streams having not only olefin product components in a desired molecular weight range, but also non-desired olefins, and also trialkyl aluminum constituents present in the effluent stream. To illustrate the difficulty encountered with such a stream, and in the fractionation of such a stream, the following example is illustrative.

Ethylene was polymerized by subjecting to elevated temperature and pressure in the presence of a trialkyl aluminum catalyst, initially charged as triethyl aluminum. After termination of the reaction, the reactor products had the following approximate composition; on an aluminum alkyl free basis—

| Fraction: | Weight percent |
|---|---|
| $C_{4-8}$ | 20 |
| $C_{10-14}$ | 30 |
| $C_{16}$ and up | 50 |

In addition to the olefins, the reactor products included a high proportion of trialkyl aluminum components, the alkyl groups corresponding approximately in distribution to the olefin fraction.

The foregoing reactor effluent mixture was subjected to distillation under a vacuum of about 10 millimeters of mercury. The temperature of the overhead during the major portion of this distillation was about 160° C., the pot temperature being about 200° C. The distillate was separated into cuts, the second cut having olefins containing 10 to 14 carbon atoms. Analysis of this cut by infrared absorption showed a content of at least about 80 weight percent trans-internal olefins, approximately 10 weight percent of vinyl olefins, and 10 weight percent vinylidine olefins. In contrast, infrared analysis of the reactor effluent charged showed that the olefins only contained about two or three weight percent of the trans-internal olefins. From the above operation, it is seen that the distillation of the reactor effluent is utterly impractical, under normal circumstances, because of the great disappearance of vinyl olefins from the olefin portion of the stream, thus destroying the utility of the product generated.

The following example illustrates a similar operation with a treatment of the reactor effluent according to the present process.

| Example | Additive | Heating time, minutes | Temperature, °C. | Weight percent trans-eicosene | Weight percent vinylidene olefins |
|---|---|---|---|---|---|
| 1 | None | (¹) | | 7.1 | None |
| 2 | Triethyl aluminum ¹ | 15 | 260 | 40.4 | 8.2 |
| 3 | do.² | 30 | 250 | 54 | 23.1 |
| 4 | do.² | 60 | 220 | 65.5 | 25.2 |
| 5 | Aluminum triethoxide | 15 | 260 | 8.4 | None |
| 6 | | 30 | 270 | 7.0 | |
| 7 | | 60 | 270 | 6.2 | |
| 8 | Aluminum triisopropoxide | 15 | 260 | 8.7 | |
| 9 | | 30 | 260 | 8.0 | |
| 10 | | 60 | 260 | 8.3 | |
| 11 | Reaction product of triethyl aluminum and aluminum triisopropoxide, equimolal. | 15 | 260 | 8.1 | None |
| 12 | do | 30 | 260 | 8.0 | |
| 13 | do | 60 | 260 | 8.3 | |

¹ To 260° C.
² In the triethyl aluminum runs, the triethyl aluminum was provided in concentrations of 0.3 weight percent, on the aluminum basis.

From the foregoing data, it is seen that exposure of the pure olefin to a temperature of the order of 260°, and in the presence of minor quantities of trialkyl aluminum, resulted in a profound and rapid increase in the unwanted internal and vinylidene olefin isomers. In contrast, when similar concentrations of aluminum compounds, having from slightly above one to three alkoxide groups, per atom of aluminum, were provided, and the heating operations were carried out, the formation of the internal and vinylidene isomers was substantially eliminated.

Example 14

In this operation ethylene was again subjected to elevated temperature and pressure in the presence of triethyl aluminum, initially, and also in the presence of a moderate quantity of an inert aromatic hydrocarbon diluent, toluene. After reaction, the reactor effluent contained approximately 30 weight percent trialkyl aluminum components and about 70 percent olefins, ignoring the toluene diluent. The olefins had a distribution approximately as follows—

| Chain length range: | Weight percent |
|---|---|
| $C_{4-10}$ | 25 |
| $C_{12-16}$ | 25 |
| $C_{18}$ and higher | 50 |

Analysis of the olefin content of the reactor effluent, by infrared absorption, showed the sample contained less than three weight percent internal olefins, and about sixteen weight percent, overall, of the vinylidene or beta branched olefins, the balance being the desired vinyl isomers.

The sample was warmed to about 40° C. and maintained at this temperature while dry air was passed into the sample through a glass frit, for a period of approximately 30 minutes. This treatment resulted in the conversion of a portion, of at least about one-third, of the alkyl groups of the trialkyl aluminum constituents, to the corresponding alkoxide groups. The so-treated mixture was then charged to a distillation flask and distilled, the first cut being an olefin fraction of from four to eight carbon olefins. The next fraction was a decene cut and then a twelve to sixteen carbon olefin fraction, leaving as residue a fraction including olefins of 18 carbon atoms or greater and the aluminum alkyls. The conditions of operation in collecting the $C_{12-16}$ fraction were about 160° C. overhead temperature at about 10 millimeters distillation pressure, the pot temperature again being up to 200° C.

Analysis of the $C_{12-16}$ fraction by vapor phase chromatography showed no increase in vinylidene content or any internal olefin content, thus showing that the distillation could be effected, after the treatment with the oxidizing gas, with no increase in proportion of undesired olefins.

As previously described, in the most highly preferred form of the present invention, the treatment of the polymerization reactor effluent, or the portion fed to the fractionation section, is accomplished by reacting with a liquid recycle stream including a process-generated aluminum higher alkoxide containing stream. This highly preferred embodiment is illustrated in connection with FIG. 1 to which attention is directed. The principal apparatus units include a polymerization reactor 11, an initial flash chamber 21, fractionating columns 31, 41, a final fractionator 51, an an oxidation reactor 61. The polymerization reactor 11 is fed by an ethylene line 16, the total reactor effluent thereafter being passed by a line 15 to an ethylene flash chamber 21. The transfer line 22 from the ethylene flash chamber is joined by a recycle line 23, forming the feed line 24 to the first fractionator 31. In the several fractionators 31, 41, 51, the alkyl aluminum alkoxide constituents present remain in the bottoms streams, these materials being of much less volatility than the olefins present. Thus, a bottoms line 53 from a final flash fractionator 51 contains virtually all the alkyl aluminum alkoxide constituents, and this relatively small stream is fed to an oxidizing reactor 61 through a bottoms line 53.

The oxidizing reactor 61 is fed with an oxidizing gas through line 62, the treated material being discharged through a bottoms line 64.

To illustrate a working example of a highly preferred embodiment in the process installation above described, the following is typical.

Example 15

In this operation ethylene and recycled ethylene are fed to the polymerization reactor 11 through the ethylene gross feed line 16, along with catalysts, which in this instance is triethyl aluminum, supplied through line 14. The ethylene is subjected to catalytic polymerization in the reactor 11, and the reactor effluent includes unreacted ethylene, olefins generated by the process, and trialkyl aluminum components, the alkyl groups thereof having a chain length distributions roughly approximating the distribution of the olefins in the reactor effluent stream 15.

The reactor effluent stream is discharged to the flash chamber 21 in which virtually all of the excess ethylene is allowed to vaporize, the chamber being maintained at a lower pressure than the reactor 11. As a result, the effluent stream from the flash chamber 21, passed through line 22 has, in a typical operation, the following approximate composition:

Component—

| Olefins: | Wt. percent |
|---|---|
| Up to $C_{10}$ inc. | 65 |
| $C_{12-16}$ | 22 |
| $C_{18}$ and higher | 11 |
| Trialkyl aluminums: $R_3Al$ | 1.5–2.0 |

(R=alkyls corresponding to olefins, averaging $R=C_8H_{11}$)

It will be understood that the trialkyl aluminum constituents present include a random mixture of individual components, the alkyl groups thereof varying according to, approximately, the distribution of the olefins in the effluent. Further, when the polymerization reaction is carried out properly, the vinyl olefin content of the stream olefins is of the order of about 90 or greater mole percent. The principal impurity is vinylidene olefins, particularly in the higher molecular weight range of the olefins, with only minor quantities or trace quantities of trans-internal olefins and virtually no cis-internal olefins.

Fed to the transfer line 22 through line 23 is the treating stream including as a principal component thereof an aluminum alkoxide compound having greater than one alkoxide group per atom of aluminum present. Generally, the aluminum alkoxide constituent of this treating stream contains at least two alkoxide groups, and in some instances the reagent will be a mixture of aluminum trialkoxides. In this instance, the recycled treating stream fed through line 23 contains alkyl aluminum dialkoxides, and is provided in proportions giving at least one mole of such higher alkoxide per mole of the trialkyl aluminum constituents in the stream to be treated. When the treating stream, on the other hand, contains aluminum trialkoxide, the necessary amount of this component is at least one-half mole per mole of trialkyl aluminum.

The treating stream and the reactor effluent promptly react in the feed line 24. The reaction actually implemented is a redistribution of the trialkyl aluminum constituents of the reactor effluent with the aluminum alkoxide constituents of the treating stream supplied through line 23. In the present instance, the aluminum alkoxide constituent of the treating stream 32 is an alkyl aluminum dialkoxide, and the treating reaction actually carried out can be represented as follows:

$$R_3Al + RAl(OR)_2 \rightarrow 2R_2AlOR$$

In the forgoing equation, R represents the same and different alkyl groups, corresponding generally to olefins in the reactor effluent portion in line 22.

The streams are then fractionated in the several fractionators and the desired olefin cuts are isolated. Because of the treatment accomplished, by the above indicated reaction in line 24 and in feeding to the first column 31, the adverse effect of the original trialkyl aluminum constituents is substantially entirely avoided, despite the drastic conditions necessarily employed in the fractionators. The first fractionator 31 separates out an overhead stream, discharged through line 32, of olefins of 4 to 10 carbon atoms inclusive, these being transferred to other consuming processes. The bottoms stream in bottoms line 33 includes olefins of 12 and more carbon atoms as well as the alkyl aluminum alkoxides. Typical operating conditions for the first fractionator are a bottoms temperature of 230°C. and an operating pressure of one atmosphere.

The second fractionator 41 provides an overhead consisting of the desired product stream, in this instance high vinyl olefins of 12 to 16 carbon atoms, inc. This product stream is virtually devoid of any increase in amount of non-vinyl olefins, containing only the small proportions initially present in the feed to the recovery section in line 22. The fractionator operates at a reduced pressure of the order of about 100 millimeters of mercury, with a bottoms temperature of from 230 to 240° C. Leaving the second fractionator 41 is the bottoms stream, including the dialkyl aluminum alkoxide, resulting from the reaction accomplished by the return treating stream 23 above mentioned. Also in the bottoms stream are the higher-than-desired olefins, in this instance including olefins of 18 up to about 30 carbon atoms, the relative amounts decreasing rapidly with the increase in chain length. This stream is then passed to the final flash fractionator 51, for vaporization of at least a portion of such heavy olefins, these being discharged through line 52. The bottoms, still including the alkyl aluminum alkoxide constituents and some of the high molecular weight olefins, is transfered by line 53 to the oxidation reactor 61.

In the oxidizing reactor 61, a reaction is conducted with oxidizing gas provided through line 62. Preferably an oxygen rich stream is employed to facilitate the oxidation, but air is also quite suitable. Oxidation temperatures of the order of up to about 100° C. are employed, and any inerts and vaporized components are discharged through line 63. The oxidation converts the dialkyl aluminum alkoxide to alkyl aluminum dialkoxide, or into constituents having an average of from about 1.8 to 2.2 alkoxide group per aluminum atom. The thus treated stream is discharged through line 64, and split into approximately equal portions, one portion being returned through line 23 for the treating step already mentioned, and the other portion being passed through line 65. The discharged stream can be subjected to hydrolysis with an aqueous reagent, which converts the alkoxide groups to the corresponding alcohols, which can be recovered for use if desired. Alkyl groups, present in the alkyl aluminum alkoxide components, are converted to the corresponding alkane hydrocarbons.

From the foregoing description and examples, it will be apparent that many variations of the process can be implemented without departing from the scope of the present invention. For example, although the invention is most frequently applicable as an improvement in the production of vinyl olefins of 12 to 16, inc., carbon atoms, in many instances, different production fractions are desired. Thus, the most desired product fraction can be 8–12 carbon olefins, 10–18, or 14 to 20, inc. When such products are the most desired, the conditions in the polymerization reactor are suitably adjusted, and, of course, the design of and/or the operations of the fractionating columns are altered accordingly.

Typical operating conditions in the polymerization reactor are 180 to 200°C. and a pressure of 2500–4000 pounds per square inch. Ethylene is almost invariably fed in substantial excess, usually of at least 50 percent of the quantity reacted. The trialkyl aluminum catalyst is provided, normally, in the proportions of 1 to 3 lb. per 100 lb. of the net ethylene reacted, expressing the trialkyl aluminum as triethyl aluminum.

The precise conditions of the treating step, provided prior to the fractionation operations in all forms of the invention, are not highly critical. Normally, the existent process temperatures of the stream are quite sufficient to permit the necessary reaction to occur in the space of several minutes.

As already described, when the treatment is carried out with air, the inert gas introduced in the system must necessarily be eliminated, for example by a pressure controlled venting. As such venting also releases some hydrocarbons, it is preferred to use concentrated oxygen, and in proportions such that the oxygen is substantially completely consumed.

In the embodiments wherein the treating reagents are gases, it is important to provide good dispersion of the gas, to assure good contact with the liquid stream being treated. Various known devices can be readily used for this purpose. For example, the oxidizing gas can be fed through a glass frit, or vigorous mechanical agitation can be supplied. In many instances, the natural turbulence provided in passing through a process line, as in line 24 of the figure, is sufficient.

In the most highly preferred embodiments, illustrated by Example 15, wherein the treatment step involves the novel interreaction of the trialkyl aluminum components with the higher alkoxide content aluminum alkoxide components, similar latitude exists. A particular benefit of such embodiments is the fact that the treatment is an entirely liquid phase reaction, the criteria of contacting is that good liquid-liquid mixing should be provided. Again, in numerous cases, mixing by turbulent flow through a process conduit is quite satisfactory. In other instances, baffles or agitation elements are used to advantage.

With respect to the final conversion of the low alkoxide components, to a higher alkoxide material, this operation is also relatively straightforward. As this step is carried out when the alkyl aluminum alkoxide components are concentrated in the non-desired, heavy olefin components, the presence of inert gas is not particularly disadvantageous. However, when it is desired to convert the alkyl aluminum alkoxide components completely to aluminum trialkoxides, it is desirable to provide pure oxygen, vigorous agitation, and temperatures of the order of 50–70° C.

The analytical procedures employed for control are relatively simple. Thus, in treating the stream containing trialkyl aluminum constituents prior to fractionation, it is necessary to know the concentration of aluminum components, which can be considered as entirely trialkyl constituents. To determine the degree of conversion of alkyl groups to alkoxide groups, hydrolysis of a sample, and measurement by infrared techniques of the amount of alkane hydrocarbons released, and of the alcohols, will show the average proportion of alkoxide groups in the aluminum constituents present. Once steady state conditions are established in a continuous process, control analyses can be performed at widely spaced intervals.

Example 16

With reference to FIG. 2, the feed components in line 24 include on a mol basis, a trialkyl aluminum mixture and olefins predominating in similar components from about $C_{10}$ to $C_{16}$, the mixture including about 20 wt. percent trialkyl aluminum, 50 wt. percent vinyl olefins, 20 wt. percent internal olefins and 10 wt. percent vinylidene olefins. Also in the feed to line 24 is included trialkoxy aluminum material whose alkoxy groups are of about the same distribution as to carbon atoms per group as are the alkyl groups of the trialkyl aluminum material, the alkoxide aluminum being fed in a ratio of about 10 percent excess above a 1:1 stoichiometric ratio of alkoxide groups to total aluminum molecules present considering an aluminum molecule to be that equivalent to a representation in $Al(R)_3$, $Al(OR)_3$, $R_2Al(OR)$, and $RAl(OF)_2$.

The fractionator 31 is primarily a flash chamber in the sense that contact time therein is short with no plates or packing in the lower portion 31–c and a major portion of the olefins in the feed is rapidly converted to vapor near the point of entry of line 24 into fractionator 31. Alkoxide-alkyl exchange reactions are virtually complete on entry of feed material to fractionator 31 so that all aluminum molecules contain at that point at least one alkoxy group. Fractionator 31 operates at a bottoms temperature of about 400° F., which is also the temperature of the flashed feed, and at a pressure of 50 mm. Hg absolute. The components 24–a, 31–a, 31–b and 33–a are not used as alkoxide manipulation devices however 31–a is a simple disengaging region to separate entrained liquid materials from the olefin vapors passing upward. Extremely pure olefins with less than 0.001 wt. percent aluminum by analysis are recovered in line 32 and alkoxides with some olefins are withdrawn at 33. The olefins in 33 are usually less than 50 percent by weight of that stream which corresponds to the removal in line 32 of about 75 percent of the olefins fed.

Example 17

Example 16 is repeated with incomplete exchange in the feed prior to entry to fractionator 31. Portion 31–c has several plates to extend contact time. Similar results are obtained with the exchange reactions continuing into fractionator 31. A higher content of aluminum materials in the product of line 32 is noted in comparison to Example 16.

Example 18

Examples 16 and 17 are repeated with other olefin/alkyl weight ratios and distributions as to molecular weight of "alkyl groups" and olefins, and as to kinds of olefins including mixtures wherein the olefins are predominantly internal, predominantly vinylidene, exclusively internal, and exclusively vinylidene. Similar results are obtained.

Example 19

Examples 16 and 17, combined with the variations of Example 18, are repeated wherein the trialkyl aluminum materials and the olefins are fed through line 24 and the alkoxide materials are fed through line 24–a. The components 24–a, 31–a, 31–b and 33–a are used for alkoxide manipulations. Portion 31–c of fractionator 31 is typically open without plates or packing as in Example 16. The bottoms temperature and that of the flashed feed at 24 is 320° F. The pressure is 50 mm. Hg absolute. Trialkyl aluminum materials with about 65 percent by weight olefins are withdrawn at 33 corresponding to removal of 50 percent of the olefins fed. The olefins flash near line 24 entry point passing upward in fractionator 31 carrying with them a minor portion, about 0.1 wt. percent trialkyl aluminum materials in vapor-droplet form. The amount of trialkoxy aluminum material fed at 24–a is about 100 percent above the stoichiometric ratio as in Example 16; however, it is determined on the basis of only the aluminum passing upward in 31 above line 24, not on the total aluminum in line 24. The alkoxide fed is diluted with olefins corresponding to those present in the system in a wt. ratio of about 10/1 (olefin-alkoxide) to increase liquid volume in contact with the vapor stream. The feed at 24–a is at about 300° F.

Purity of olefins in line 32 is comparable to Example 16 wtih regard to aluminum content, namely 0.001 wt. percent aluminum by analysis and degradation by isomerization and dimerization type reactions is inconsequential. An alkoxy-alkyl aluminum species is obtained at line 33–a which for example may then be completely oxidized, and hydrolyzed to yield alcohols. The olefins may be processed as by fractionation into cuts using high temperatures without degradation, selected cuts being fed to displacement operations. The trialkyl aluminum materials at 33 may be used in typical reactions for such, for example, displacement.

We claim:
1. A process for the separation of alpha olefins of high vinyl olefin content from a mixture with trialkyl aluminum components, comprising adding to and treating said mixture with a recycled aluminum alkoxide reactant having in excess of one alkoxide group per atom of aluminum and in proportions sufficient to provide at least one alkoxide group per atom of aluminum in the treated mixture, then vaporizing at least a portion of the olefins from said treated mixture, said distillation being at an elevated temperature at which positional and structural isomerization of the olefins would occur when trialkyl aluminum components are present, then oxidizing the alkyl aluminum alkoxide components to increase the alkoxide groups to more than one alkoxide group per atom of aluminum, and recycling at least a part of the resultant aluminum alkoxide component to the aforesaid treating operation.

2. A process for the separation of vinyl alpha olefins from a mixture with trialkyl aluminum components comprising,
   adding to and treating said mixture with an aluminum alkoxide reactant having in excess of one alkoxide group per atom of aluminum and in proportions sufficient to provide at least one alkoxide group per atom of aluminum in the treated mixture,
   then vaporizing at least a portion of the olefins from said treated mixture, said vaporizing being at an elevated temperature at which positional and structural degradation of the olefins could occur if trialkyl aluminum components were present.

3. The process of claim 2 wherein the treatment is for a sufficient period prior to the separation phase to effect substantially complete conversion.

4. A process for the separation of olefins from a mixture with trialkyl aluminum components comprising,
   adding to and treating said mixture with an aluminum alkoxide reactant having in excess of one alkoxide group per atom of aluminum and in proportions sufficient to provide at least one alkoxide group per atom of aluminum in the treated mixture,
   then vaporizing at least a portion of the olefins from said treated mixture.

5. The process of claim 4 wherein at least a part of the olefins are vinyl olefins.

6. A process for the separation of olefins from a mixture with trialkyl aluminum components comprising,
   adding to and treating said mixture with an aluminum alkoxide reactant having in excess of one alkoxide group per atom of aluminum and in proportions sufficient to provide at least one alkoxide group per atom of aluminum in the treated mixture,
   then separating at least a portion of the olefins from said treated mixture.

7. The process of claim 6 wherein a significant portion of the olefins and the trialkyl aluminum components are in the vapor phase and the aluminum alkoxide materials are in the liquid phase.

References Cited
UNITED STATES PATENTS

| | | | |
|---|---|---|---|
| 3,042,696 | 7/1962 | Aldridge | 260—448 |
| 3,206,522 | 9/1965 | Poe et al. | 260—683.15 |
| 3,217,058 | 11/1965 | Hunt | 260—682 |
| 3,240,838 | 3/1966 | White et al. | 260—683.2 |

PAUL M. COUGHLAN, Jr., *Primary Examiner.*